S. M. Longley,
Differential Pulley.

Nº 50,607.        Patented Oct. 24, 1865.

Witnesses
A. C. Getty
L. Holmes

Inventor
S. M. Longley

UNITED STATES PATENT OFFICE.

SAMUEL M. LONGLEY, OF HUDSON, NEW YORK.

IMPROVEMENT IN HOISTING APPARATUS.

Specification forming part of Letters Patent No. 50,607, dated October 24, 1865.

*To all whom it may concern:*

Be it known that I, SAMUEL M. LONGLEY, of Hudson, in the county of Columbia and State of New York, have invented a new and Improved Portable Hoisting Apparatus; and I do hereby declare the following to be a full, clear, and exact description of the same, reference being had to the accompanying drawings, in which—

Figure 1:
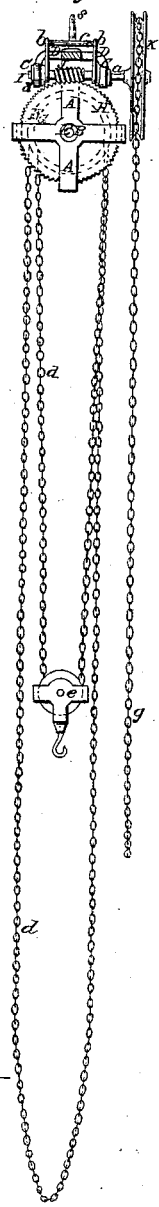
Figure 2:
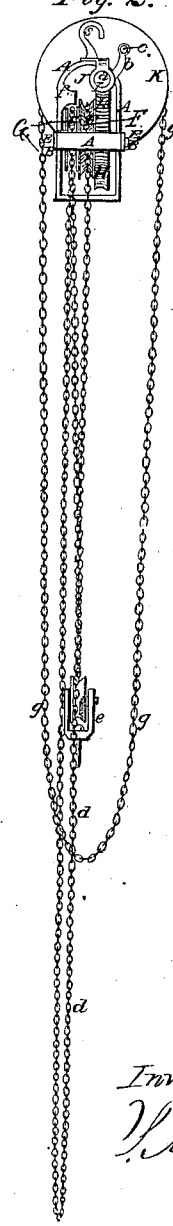

Figure 1 represents a front view of the apparatus. Fig. 2 is a side view of the same.

Similar letters of reference indicate corresponding parts in both figures.

The object of my invention is to provide a convenient portable hoisting apparatus that may be used for lifting either very heavy or moderate weights; and to this end it consists in a certain construction of the apparatus, whereby great lifting-power is obtained, and such power may be so varied as to obtain a slow movement for heavy weights and a quicker movement for lighter weights.

To enable others skilled in the art to construct my invention and apply it to use, I will proceed to describe it, having reference to the drawings.

A is a metallic frame or sheave block, made with a hook, S, at the top, to suspend it from any suitable support, and having two bearings, B B, at or near the center, in the manner of an ordinary sheave-block, and also two other bearings, C C, in a yoke, D, the arms of which project from the upper part of the said frame.

In the bearings B B there is fitted a rotating shaft, E, having rigidly secured to it a double-grooved or differential pulley, F G, and a worm-wheel, H.

In the bearings D D is fitted a rotating shaft, I, situated at right-angles to the shaft E, carrying a worm or endless screw, J, between the said bearings, the said screw being intended to gear with the teeth of the worm-wheel H. The said shaft I has also secured on one end a power-wheel, K. In Fig. 1 the worm is exposed to view by a part of the frame being broken away.

The bearings D D are fitted with loose circular boxes *a a*, connected with each other by two levers, *b b*, and a cross-bar, *c*, and the shaft I revolves in the circular boxes out of the center of the same, making the said bearings eccentric, by which means the worm may be either let into or taken out of gear with the worm-wheel by moving up or down the levers *b b*.

Over the differential or double-grooved pulley F G passes a double chain, *d*, which may be endless, as represented, or be open in the part which depends from the larger grooved portion F of the differential pulley F G, and which is prevented from slipping over the pulleys by the links of the chain resting in cavities or against studs in the groove of said pulleys, and the bight of the chain which depends from the smaller grooved portion G of the differential pulley F G passes through and suspends a loose or traveling sheave-block, *e*, having a swiveled hook on its lower end to attach the weight to be raised.

Projecting from the interior of the frame A is a guard or covering, *f*, over the grooves of pulley F G, to prevent the chain *d* from "over-riding" the studs or projections in the said grooves or running out of its proper channel, and thereby preventing the sudden jolting of the weight and consequent straining of the chain by the links of same slipping back into their seat or spaces between the studs.

The power-wheel K is grooved and provided with studs or projections and depressions in its groove, over which passes an endless rope or chain, *g*.

The differential pulleys F G may be used alone as a convenient hoisting apparatus when moderate weights are to be hoisted by throwing the worm out of gear, the purchase being then obtained by hauling the portion of the double chain *d* dependent from the larger grooved portion F of the double-grooved pulley F G; but when a very powerful lifting apparatus is required the endless screw J is thrown into gear with the worm-wheel H and the purchase applied by hauling on the chain *g*.

The means or device for disengaging the endless screw from the worm-gear may be varied or modified. That which is shown in the drawings and herein described is only represented and described for the reason that it is as well suited as any other for the purpose of illustrating my invention.

What I claim as my invention, and desire to secure by Letters Patent, is—

1. The endless screw J and worm-wheel H, in combination with the differential or double-grooved pulleys F G and the suspended frame A, substantially as herein described.

2. In combination with the sheave or frame A, the guard or covering $f$, constructed and operating in the manner and for the purpose substantially as herein described.

3. The combination, in one suspended frame, of a differential pulley, F G, a worm-wheel, H, endless screw J, and a disengaging device for throwing the endless screw out of gear, the whole operating substantially as herein set forth.

S. M. LONGLEY.

Witnesses:
A. C. GETTY,
HENRY T. BROWN.